United States Patent [19]

Hunke

[11] Patent Number: 5,066,210
[45] Date of Patent: Nov. 19, 1991

[54] APPARATUS FOR COOLING AND GRANULATING EXTRUSIONS OF THERMOPLASTIC MATERIAL

[75] Inventor: Friedrich Hunke, Grossostheim, Fed. Rep. of Germany

[73] Assignee: Automatik Apparate-Maschinenbau GmbH, Grosbostheim, Fed. Rep. of Germany

[21] Appl. No.: 350,529

[22] PCT Filed: Sep. 2, 1988

[86] PCT No.: PCT/EP88/00802
§ 371 Date: Apr. 26, 1989
§ 102(e) Date: Apr. 26, 1989

[87] PCT Pub. No.: WO89/01858
PCT Pub. Date: Mar. 9, 1989

[30] Foreign Application Priority Data
Sep. 4, 1987 [DE] Fed. Rep. of Germany ....... 3729686

[51] Int. Cl.$^5$ ............................................ B29C 47/78
[52] U.S. Cl. ..................................... 425/71; 425/308; 425/382.2; 264/178 F; 264/142
[58] Field of Search ...................... 425/71, 308, 382.2, 425/67, 68, 69, 72.2; 264/178 F, 180, 142, 181, 203

[56] References Cited
U.S. PATENT DOCUMENTS

| 2,324,397 | 7/1943 | Hull | 264/178 F |
|---|---|---|---|
| 2,800,088 | 7/1957 | Leibundgut | 425/377 X |
| 2,895,165 | 7/1959 | Fry, Jr. | 425/67 |
| 3,400,184 | 9/1968 | Matsuo et al. | 264/180 |
| 4,025,252 | 5/1977 | Hunke | 425/71 |
| 4,192,635 | 3/1980 | Hunke et al. | 425/71 |
| 4,269,046 | 5/1981 | Strahm et al. | 425/71 X |
| 4,528,157 | 7/1985 | Lettner et al. | 425/71 X |
| 4,530,649 | 7/1985 | Philipp et al. | 425/71 |
| 4,756,679 | 7/1988 | Stibal et al. | 425/72.2 |
| 4,913,899 | 4/1990 | Hartig | 425/71 |

FOREIGN PATENT DOCUMENTS

| 2503455 | 7/1976 | Fed. Rep. of Germany | 425/71 |
|---|---|---|---|
| 2655840 | 6/1978 | Fed. Rep. of Germany | |

Primary Examiner—Jay H. Woo
Assistant Examiner—Robert B. Davis
Attorney, Agent, or Firm—Owen J. Meegan; Aubrey C. Brine

[57] ABSTRACT

Apparatus for cooling and granulating extrusions of thermoplastic issuing from extrusion dies is provided with a pair of mirror image symmetric channels formed of guide plates arranged back to back. The upper ends of the channels are exposed to a cooling medium and the lower ends are directed to the entrance of a granulator having draw-in rollers. The guide plates are laterally separable from one another to provide increased tension in the extrusion being fed to the granulator.

5 Claims, 3 Drawing Sheets

APPARATUS FOR COOLING AND GRANULATING EXTRUSIONS OF THERMOPLASTIC MATERIAL

BACKGROUND OF THE INVENTION

The invention relates to an apparatus for cooling and granulating extrusions of thermoplastic material from extrusion dies comprising two substantially mirror symmetric output channels arranged back to back, whose upper ends are exposed to a cooling water supply and whose lower ends are directed to the entrance of a granulator with draw-in rollers and a cutting roller. The output channels project in the direction of the extrusions with respect to the connecting line of the extrusion dies and the entrance of the draw-in rollers between the dies and the draw-in roller entrance, and are exposed to spray nozzles for the purpose of cooling the extrusions.

Such an apparatus is known from the German patent 26 55 840. This apparatus is based on the object of providing particularly high capacity, for which the two substantially mirror symmetric channels arranged back to back are provided. Due to the arrangement of two channels, the capacity is doubled compared to having only one single channel, as is known from the German patent 25 03 455, where the doubling essentially results from doubling the number of extrusions. The configuration of each of the two output channels according to the German patent 26 55 840, which according to the disclosure in this patent are fixed with respect to one another, follows essentially the teaching of the German patent 25 03 455, according to which the extrusions are guided securely by the projection of the output channels between the dies and the draw-in rollers. The German patent 25 03 455 according to claim 6, also discloses the possibility of adjusting the amount of this projection.

SUMMARY OF THE INVENTION

The object of the present invention is to provide a technically easily realizable adaptability of the apparatus to synthetic extrusions of the most different type and to achieve a particularly intensive cooling effect. In accordance with the invention this takes place in that the ends of the output channels directed to the extrusion dies and the draw-in rollers are each formed by a pair of guide plates, which are arranged above one another enclosing a free space and forming a channel. Each pair of guide plates can be laterally separated from one another so that when increasing the separation, the projection of the corresponding channel with respect to the connecting line increases hence increasing the tension of the extrusions to be granulated.

Due to the arrangement of two pairs of guide plates at a distance above one another, both variously large projections and also different inclinations of the guided extrusions with respect to the vertical can be provided, since the guidance of the extrusions in the upper and lower regions of the formed channels can be individually configured through the individually adjustable separation of the guide plates of each pair. By the provision of the intermediate free descent space between the two pairs of guide plates, the extrusions passing through this free space can be exposed on all sides to an intensive cooling, without the cooling in this region being hindered by the contact of the extrusions to a guide plate. The cooling liquid sprayed onto extrusions by spray nozzles in this region is therefore particularly effective here. It is expedient to mount the guide plates of each pair at their upper end on a common rotational axis whereby the ends opposed to the rotational axis can be separated from one another by an expansion device arranged between the guide plates of each pair. With such an arrangement, it is possible to widen the channels from one another formed by the two pairs of guide plates, simply by rotating the guide plates in each pair in the sense of a spreading or an expansion. Thus, mounting the guide plates involves simple constructive means.

It is expedient to provide a draw spring between the guide plates, which draws the plates of each pair together, so that they can be simply adjusted by pressure means acting from the inside. Any suitable pressure means, for example a cam or the like, can be arranged between the guide plates to provide the desired position of the plates.

DESCRIPTION OF THE PREFERRED EMBODIMENT

Figure 1:
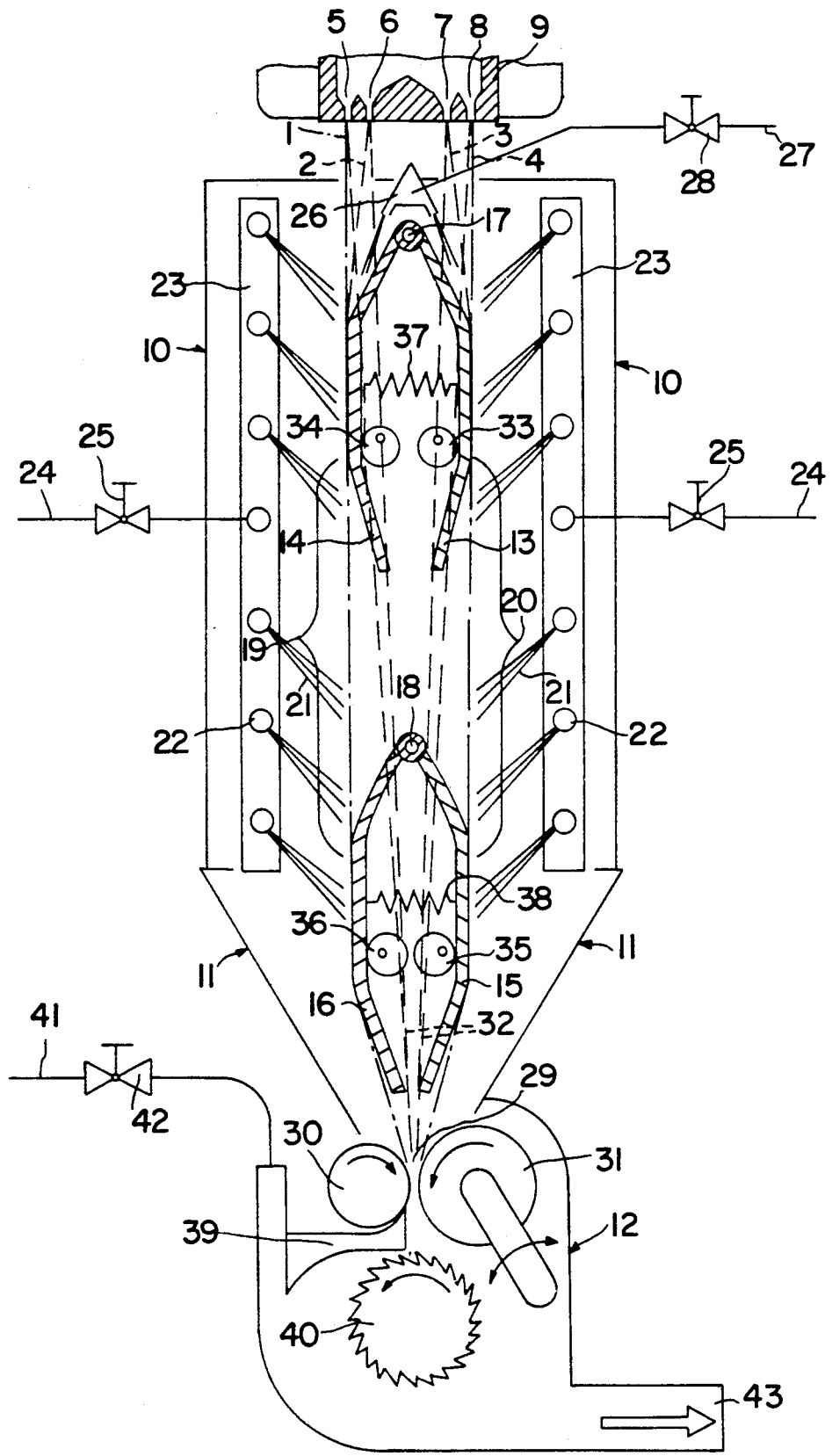
FIG. 1 shows the apparatus with two pair of guide plates, which are each mounted on a rotational axis.
Figure 3:
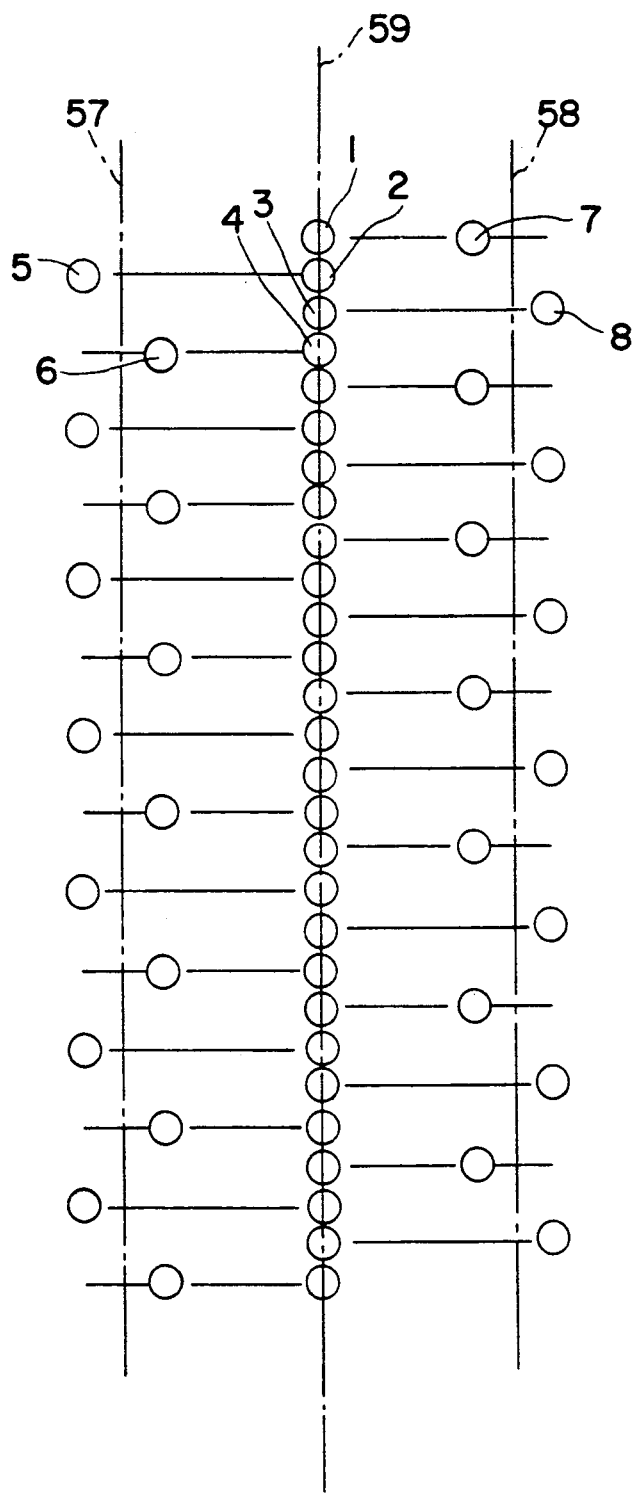
FIG. 3 shows a representation in principle of the spatial arrangement of the extrusions with respect to one another directly after leaving the extrusion dies and directly before the entrance into the draw-in rollers.

FIG. 1 illustrates an apparatus for cooling and granulating extrusions 1, 2 and 3, 4 of thermoplastic material, illustrated by the dot-dash lines, where the extrusions exit from rows of dies 5, 6 and 7, 8 (see FIG. 3). The dies 5, 6 and 7, 8 are provided in the extrusion plate 9.

The elongated housing 10 is located below the extrusion plate 9, which consists essentially of a sheet metal casing open at the top and a conical exit 11 at the bottom directed to the granulator 12. The guide plates 13, 14 and 15, 16 are provided in the housing 10 which respectively form one pair 13/14 and 15/16. The guide plates 13, 14 are mounted at their upper ends on the common rotational axis 17, the guide plates 15, 16 are mounted on the common rotational axis 18. The sequential arrangement of the guide plates 13, 15 and 14, 16 each form a channel for the extrusions 1, 2 and 3, 4 respectively, whereby each channel is interrupted by the free descent space 19 or respectively 20. In the free spaces 19 and 20, the extrusions 1, 2 or 3, 4 respectively are freely accessible on all sides to the application of water streams 21, which issue from the spray nozzles 22. Seven such spray nozzles 22 are provided on a support 23 arranged on each side of the guide plates 13, 14 and 15, 16 respectively. The spray nozzles 22 are supplied with spray fluid, in particular cooling water, via the supply lines 24, in which control valves 25 are arranged. The cooling water line 26 is provided above the pair of guide plates 13, 14, and is supplied with cooling water via the line 27 and the control valve 28.

The connecting lines 32, illustrated as dashed lines, are shown in FIG. 1 extending from the dies 5, 6 and 7, 8 respectively to the entrance 29 of the two draw-in rollers 30, 31. The outer surfaces of the guided plates 13, 14 and 15, 16 project beyond these connecting lines, so that the extrusions 1, 2 and 3, 4 issuing from the dies 5, 6 and 7, 8 respectively must pass a different path with respect to these connecting lines 32, whereby the extrusions 1, 2 and 3, 4 respectively acquire a certain desired tension and a guiding effect by means of the guide plates 13, 14 and 15, 16.

The degree of projection of the guide plates 13, 14 and 15, 16 with respect to the connecting lines 32 can then be adjusted in that the guide plates are more or less separated from one another. According to FIG. 1, the rotatable cams 33, 34 for the guide plates 13, 14 and the rotatable cams 35, 36 for the guide plates 15, 16 serve this purpose. As can be seen from FIG. 1, the two cams 33, 34 of the two upper guide plates 13, 14 are further rotated with respect to the axes, illustrated simply as a point, as the cams 35, 36, so that the guide plates 13, 14 are further separated from one another as the guide plates 15, 16. Depending on the material to be processed, the guide plates 13, 14 and 15, 16 can then be adjusted with respect to their distance from one another by the adjustment of the cams 33, 34 and 35, 36 respectively, where the difference individually can be different through a different rotation of the discussed cams. The apparatus illustrated in FIG. 1 is therefore universally adaptable to all possible thermoplastic materials to be processed present in the form of extrusions. The two draw springs 37 and 38 are provided so that the cams 33, 34 and 35, 36 always contact the guide plates 13, 14 and 15, 16 respectively from the inside, which give the guide plates the necessary biasing to the inside.

The granulator 12 also shown in FIG. 1 is a known device, consisting of the two draw-in rollers 30, 31 and the cutting wheel 40 acting with the counter-cutter 39. The granulator 12 is supplied with cooling water via the supply line 41 and the control valve 42. The produced granules are discharged together with the cooling water at the outlet 43. Reference is also made here to the German patent 26 55 840.

Figure 2:
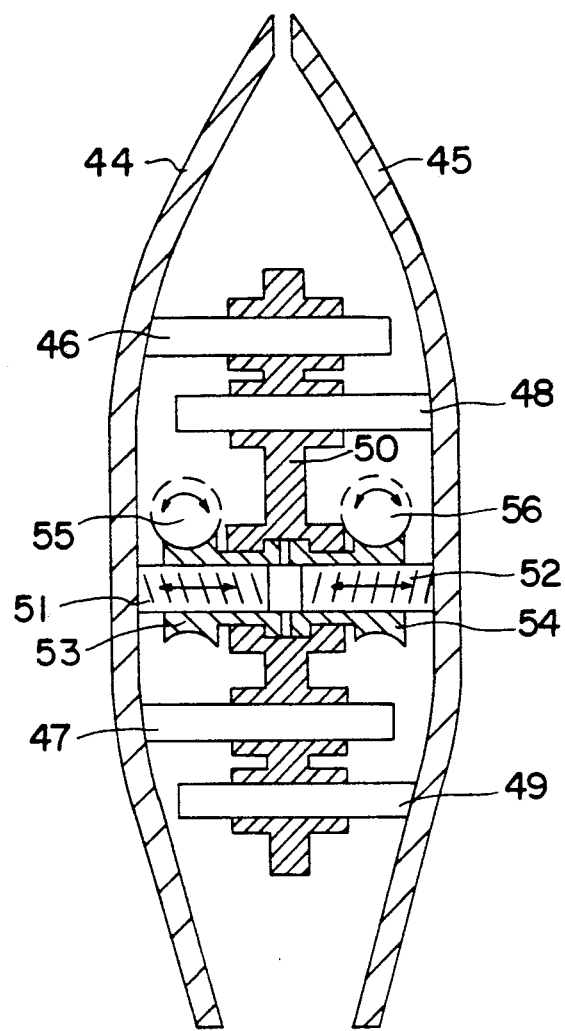
FIG. 2 shows an individual pair of guide plates with means for parallel shifting.

FIG. 2 illustrates another configuration of the pair of guide plates 44, 45, by which the plates are mounted for parallel shifting. The guide plates 44, 45 comprise guide rods 46, 47 and 48, 49, respectively, which are directed to the inside and which are mounted to be laterally shiftable in corresponding guides of a common support 50. The guide plates 44, 45 are driven laterally by means of adjustment spindles 51, 52 mounted on them, which are screwed into rotatable nuts 53, 54. These nuts 53, 54 are formed as screws on their outer circumference, which engage as screws in the drive spindles 55 and 56. When rotating the drive spindles 55 and 56, the guide plates 54 and 55 are correspondingly shifted laterally, where depending on the amount of rotation of the drive spindles 55 and 56, naturally a common or individual positioning is possible.

The increase in capacity of the apparatus is made clear in FIG. 3. FIG. 3 shows the dies 5, 6 and 7, 8 which are arranged symmetrically to the dot-dashed center lines 57 and 58 of the extrusion die plate 9. According to FIG. 3, the die plate 9 comprises seven dies 5, 6, 7 and 8 each in the longitudinal direction along the center lines 57 and 58 arranged adjacent to one another.

The extrusions 1, 2 and 3, 4 issuing from the dies 5, 6 and 7, 8 respectively are then passed through the apparatus according to FIG. 1 and arrive at the entrance 29 of the granulator 12 where they lie practically directly adjacent to one another along the center line 59. At this point, the extrusions 1, 2 and 3, 4 are already cooled so far that they can readily come into contact without sticking to one another.

I claim:

1. Apparatus for cooling and granulating extrusions of thermoplastic material issuing from extrusion dies comprising:

a pair of substantially mirror image symmetric channels arranged back to back disposed between a plurality of extrusion dies and a granulator having draw-in rollers, a cutting wheel and an entrance disposed below said extrusion dies;

each channel having an upper end exposed to a cooling water supply and a lower end directed toward said granulator entrance, each channel extending laterally beyond an imaginary straight line projected from said dies to said granulator entrance;

a plurality of spray nozzles disposed along each of said channels for cooling said channels;

said channels each being formed by a first pair of laterally spaced guide plates and a second pair of laterally spaced guide plates, said pairs of guide plates being disposed one above the other and arranged to provide a descent space therebetween to provide cooling on all sides of an extrusion directed along a said channel as it passes along said space and said guide plates of each said first and second pair of guide plates being laterally separable from one another whereby with increasing separation each said channel increases in lateral distance beyond the imaginary straight line between the dies and said granulator entrance to provide increased tension in an extrusion directed along a said channel from said extrusion dies to said granulator entrance.

2. Apparatus as set forth in claim 1 wherein each said pair of guide plates is provided with expansion means disposed therebetween for separating a respective pair of guide plates one from the other.

3. Apparatus as set forth in claim 2 wherein each said pair of guide plates further includes a spring means disposed between said guide plates for drawing said guide plates together.

4. Apparatus as set forth in claim 1 wherein the guide plates of said first and second pair of guide plates are each mounted at its upper end of a common rotation axis and each pair of guide plates further comprises expansion means arranged between said guide plates for separating said guide plates one from the other.

5. Apparatus as set forth in claim 4 which further includes spring means disposed between each said pair of guide plates for drawing said guide plates together.

* * * * *